UNITED STATES PATENT OFFICE.

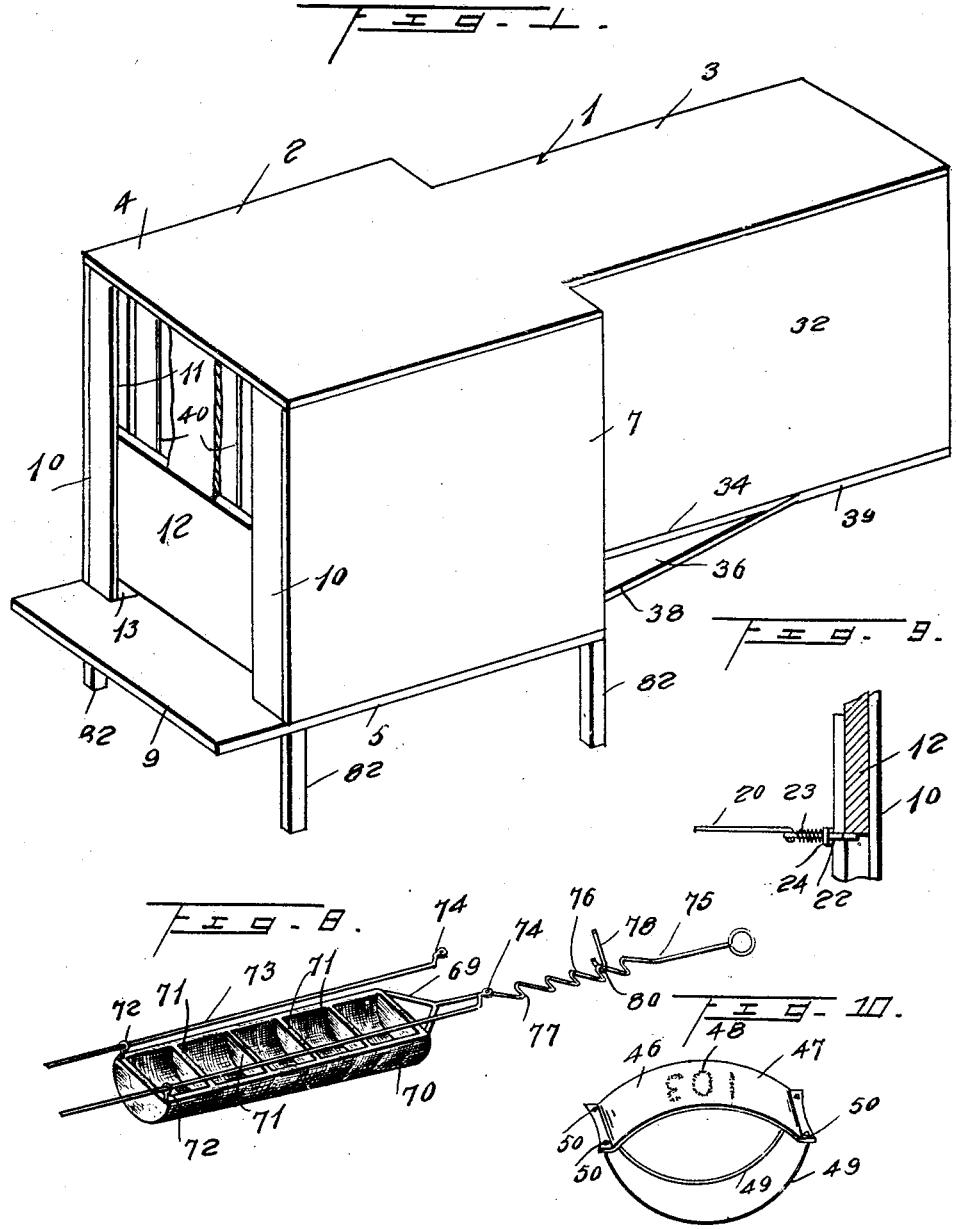

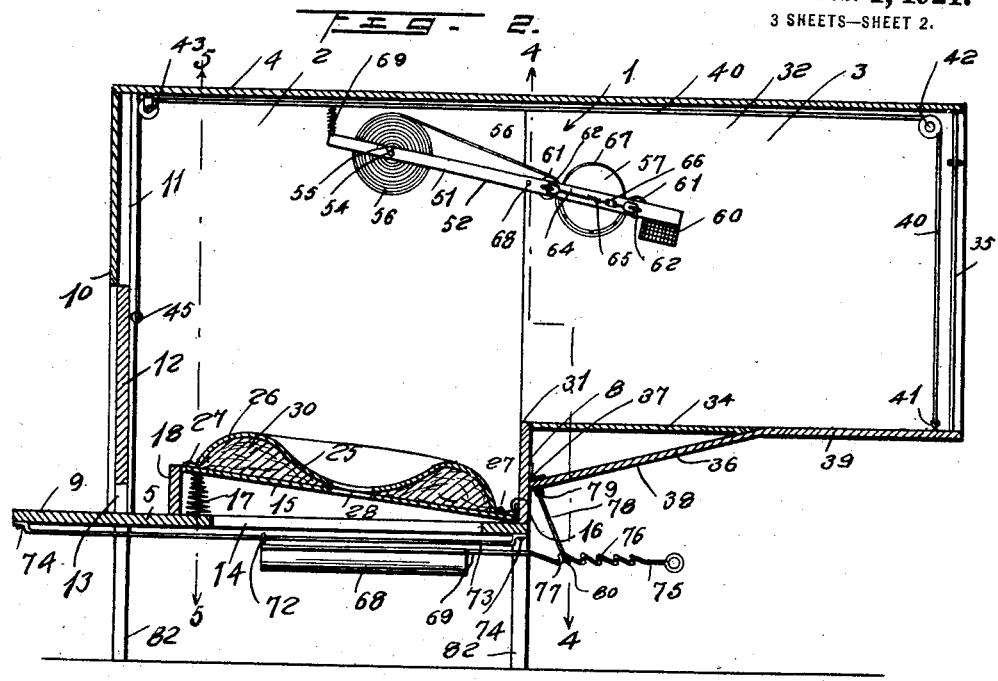

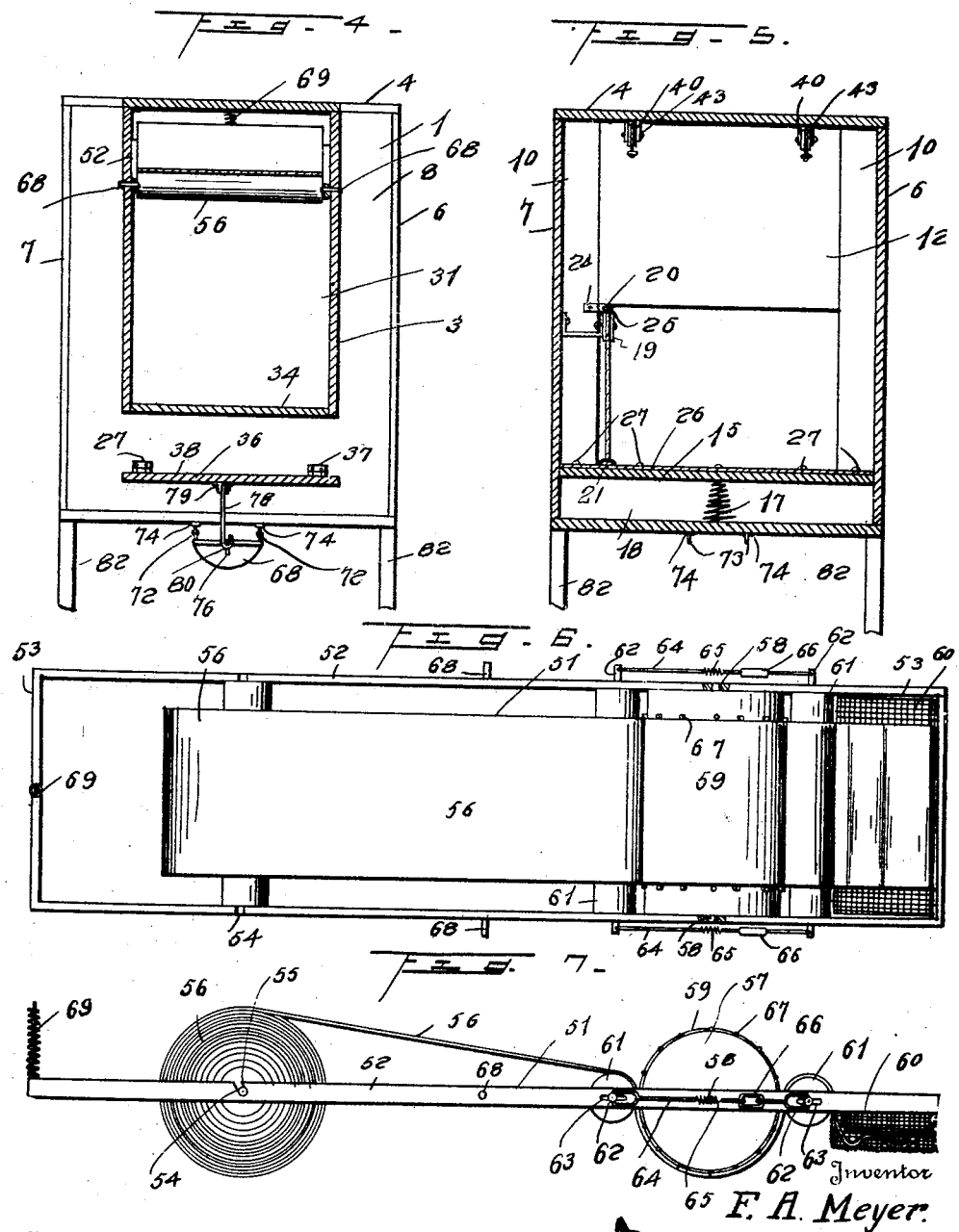

FRANK A. MEYER, OF LINN, KANSAS.

AUTOMATIC TRAP-NEST.

1,367,198.      Specification of Letters Patent.      Patented Feb. 1, 1921.

Application filed March 20, 1918. Serial No. 223,540.

*To all whom it may concern:*

Be it known that I, FRANK A. MEYER, a citizen of the United States, residing at Linn, in the county of Washington and State of Kansas, have invented certain new and useful Improvements in Automatic Trap-Nests; and I do hereby declare the following to be a full, clear, and exact description of the invention, such as will enable others skilled in the art to which it appertains to make and use the same.

This invention relates to trap nests and the primary object of the invention is the provision of an improved nest having means for determining the hens which are laying and the hens which are laying the eggs of the best quality, the nest being so constructed as to be automatic in its operation and thus not require an assistant to set the trap and release the hen.

Another object of the invention is the provision of a trap nest which has a registering device positioned in the same, so that each hen when leaving the nest will come in contact with the same, the hens being each provided with a raised name plate, so that as each hen leaves the nest the number or name of the hen will be imprinted, thereby leaving a record of each hen leaving the nest.

A further object of the invention is the provision of an improved trap nest, in which a hinged supplemental flooring is provided, which carries the nest, the hinged supplemental flooring being normally held in a raised position by a coil spring, the flooring having connection with the door controlling the opening into the nest, which connection between the flooring and door being so that when a hen is sitting on the nest, the weight of the hen will lower the flooring against the tension of the coil spring and automatically close the door.

A further object of the invention is the provision of a trap nest having a front and rear door, the doors being operatively connected together so that movement of one will cause the operation of the other, the rear door being so constructed that when the weight of a hen is on the same, the same will be swung downward and automatically open the front door, thus allowing another hen to enter the nest. A still further object of the invention is the provision of a trap nest having a sliding egg carrier, which has a plurality of compartments therein, each compartment being adapted to receive one egg, the carrier being operatively connected to the rear door so that when the hen steps on the same the carrier will be slid forwardly thus positioning another compartment of the same in operative position.

Another object of the invention is the provision of an improved trap nest, which is automatically operated by the hen and having means for determining the number of each hen leaving the nest and the egg laid by each hen.

A still further object of the invention is the provision of an improved device of the above character which is durable and efficient in use, one that is simple and easy to construct and one that can be placed upon the market at a reasonable cost.

With these and other objects in view the invention consists in the novel construction, arrangement and formation of parts, as will be hereinafter more specifically described, claimed and illustrated in the accompanying drawings forming a part thereof, in which:—

Figure 1 is a perspective view of the improved trap nest showing the front door in closed position, Fig. 2 is a central vertical longitudinal section through the same showing the door in lowered position, Fig. 3 is a central horizontal section taken through the improved nest, showing the door in raised position, Fig. 4 is a transverse section taken on the line 4—4 of Fig. 2, Fig. 5 is a transverse section taken on the line 5—5 of Fig. 2, Fig. 6 is a plan view of the improved registering attachment removed from the nest, Fig. 7 is a side elevation of the improved registering attachment removed from the nest, Fig. 8 is a detail perspective view of the egg carrier, Fig. 9 is a detail fragmentary view showing the bolt for holding the front door in a raised position, and Fig. 10 is a detail perspective view of the name plate, which is adapted to be attached to each hen.

Referring to the drawings in detail wherein similar reference numerals designate corresponding parts throughout the several views, the numeral 1 generally indicates the improved trap nest which includes a main compartment 2 and the rearwardly extending compartment 3. The main compartment 2 includes upper and lower walls 4 and 5, side walls 6 and 7 and a rear wall 8. The bottom wall 5 is extended beyond the side walls 6 and 7 to provide a platform 9 for the hens to hop upon when entering the trap. The lower half of the front of the trap nest is left open, and a pair of guide strips 10 is secured to the forward outer ends of the side walls 6 and 7 and each of the strips is provided with a groove 11 which slidably receives the front door 12, which is arranged to control the entrance of the hens into the trap. Stops 13 are positioned in the lower ends of the grooves 11 so as to limit the closing movement of the door so as to leave a space between the door and the bottom wall, for the entrance of air into the trap. The bottom wall of the trap is provided with an opening 14 and a supplemental flooring 15 completely overlies the same. The supplemental flooring 15 extends entirely over the lower portion of the trap and ends short of the door 12, and the same is pivotally secured by hinges 16 at its rear end to the floor 5 and the forward end of the same is normally held in a raised position by an expansion coil spring 17, which is positioned intermediate the flooring 15 and the lower wall 5. A suitable guide strip 18 is positioned across the raised portion of the supplemental flooring 15 and secured to the flooring 5 so as to protect the spring and prevent any article from getting between the supplemental flooring and the lower wall 5. A pulley 19 is secured to the upper portion of the main compartment 2 adjacent the forward end thereof and a flexible rope 20 is trained about the same and the rope has one end of the same connected to the forward end of the supplemental flooring as at 21 and its upper end connected to a sliding bolt 22, which is held in a normally projected position by a coil spring 23 which is coiled around the same and has one of its ends connected to a bracket 24 secured to one of the side strips 10 and its rear end secured to the bolt. The front end of the bolt is adapted to be normally held by the spring in the path of the sliding door 12 and is arranged to normally hold the door in a raised position and it will be seen that when a hen enters the nest and steps on the supplemental flooring 15 her weight will swing the flooring downward and thereby draw the bolt back against the tension of the spring and allow the door 12 to gravitate to its closed position. The supplemental floor 15 has secured thereto a suitable nest 25 for the hen to sit on and the same is preferably constructed of a square piece of cloth netting 26 which is turned around the edges of the same as at 27 to the supplemental flooring, and the central portion thereof is provided with an aperture 28 through which the eggs are adapted to drop. The nest is so constructed that a suitable inclination 29 is provided so that the eggs will roll to the hole 28. Suitable absorbent cotton or other soft padding is placed between the supplemental flooring 15 and the cloth netting 26.

The rear wall 8 is provided with an opening 31 and the same extends from the top wall to a point short of the lower wall and the rear compartment 3 is arranged to be connected to the main compartment 2 so as to completely cover the opening 31 and extend rearwardly therefrom. The compartment 3 consists of side walls 32 and 33 and a lower wall 34 which extends short of the ends of the side walls of the compartment so as to leave the rear lower portion of the same open. A plurality of metallic bars 35 are secured to the rear portion of the trap so as to inclose the rear end of the same and at the same time allow light and air to enter the trap.

A platform or runway 36 is pivotally secured to the rear wall 8 by suitable hinges 37 positioned below the lower wall 34 of the compartment 3. The runway or platform 36 consists of an upwardly inclined portion 38 which extends rearwardly to the rear end of the wall 34 and a rearwardly extending horizontal portion 39, which is adapted to close the bottom of the compartment 3 left open by the bottom wall 34. Flexible ropes 40 are connected to eyes 41, which are secured to the rear end of the horizontal portion 39 and the ropes 40 are trained over pulleys 42 secured to the side walls of the compartment 3 and pulleys 43 secured to the upper wall 4 of the compartment 2 and are then secured to eyes 45 secured to the upper portion of the sliding front door 12. By this connection, it will be seen that when a hen leaves the main compartment 2 and enters the rear compartment 3 and steps on the horizontal portion 39, her weight will throw the same downwardly and the flexible connection 40 will draw the front door 12 upwardly and as soon as the front door 12 rides past the bolt 22, the spring 23 will throw the same outwardly and thus the door will be held in its raised position. Thus it will be seen that when a hen leaves the trap, the same will be automatically set for another hen, and when a hen enters the trap and steps on the flooring as heretofore described, the door 12 which is suitably weighted will be allowed to slide downwardly thus raising the platform or runway 38. When the runway or platform 38 is thrown downward, the horizontal portion 39 forms a suitable inclined portion for the hen to walk down.

Each of the hens is provided with a name plate 46 as shown in Fig. 10 and the same consists of an arcuate plate 47 having the number of the hen stamped out in raised letters as shown at 48 and flexible cords 49 are arranged to be secured at 50 to the corners of the plate. These cords are adapted to extend under the wings of the hen, so as to secure the name plate in position. A registering attachment 51 is secured to the upper portion of the trap and is so arranged that as each hen leaves the nest her number will be suitably printed on a paper strip which will hereinafter be more fully described. The registering attachment 51 consists of a substantially rectangular frame including side bars 52 and end bars 53. The side bars are provided with inwardly and downwardly inclined slots 54 at opposite points and these slots are adapted to rotatably receive the ends of a shaft 55 carrying a roll of paper 56. A drum 57 is keyed to a shaft 58, which is rotatably mounted on the longitudinally extending bars 52 at a point spaced from the paper roll 56 and this drum has secured to its periphery a sheet of carbon paper 59 which is detachably held in position thereon. The rear end of the frame carries a wire basket 60, the purpose of which will hereinafter more fully appear. The roll of paper is adapted to be threaded under the drum 57 and between suitable guide rollers 61 which are carried by shafts 62 rotatably and slidably mounted in slots 63 formed in the longitudinally extending bars and the ends of the shafts 62 are connected together by suitable connecting members 64, which carry a spring tensioning device 65, which normally tends to draw the shafts toward each other and holds the rollers into firm engagement with the drum 57, thus the paper strip is held in engagement with the drum. The connecting member 64 may be provided with a turnbuckle 66 for adjusting the tension of the spring 65 if so desired. Each end of the drum is provided with a row of outwardly projecting lugs 67 which provide means for preventing the paper strip from riding off of the same. The registering device 51 is pivoted intermediate its ends by outwardly extending pintles 68 which are journaled to the side walls 32 of the rear compartment 3 adjacent to the point of connection of the rear compartment 3 with the main compartment 2 and the rear end of the registering attachment is normally held in a downwardly inclined position by a contractile coil spring 69, which is connected to the forward transverse bar 53 and the upper edge of the trap. Thus it will be seen that as the hen leaves the nest, her back, carrying the name plate 48 will come in engagement with the paper strip 56 threaded under the drum 57 and the raised letters on the plate will force the carbon paper to leave a suitable impression on the strip, and the drum will be rotated and the paper strip moved a short distance allowing a clean piece of same to come underneath the drum. The portions of the paper bearing the printed numbers will fall into the basket 60.

A suitable canvas egg carrier 68 is positioned beneath the trap and the same consists of a wire frame 69 and a canvas body 70, which is divided by suitable partitions 71 into separate egg receiving compartments. Eyes 72 are formed on the front end of the wire frame 69 and slidably and pivotally connect the front end of the egg carrier 68 to guide wires 73, the terminals of which are provided with eyes 74, which are secured to the lower wall 5 of the main compartment 2. The egg carrier 70 is positioned directly below the opening 28 so that the egg will fall directly into the same. The rear end of the wire frame 69 terminates in a rearwardly extending rod 75 which has a plurality of ratchet teeth 76 formed therein, which teeth are inclined rearwardly and downwardly as at 77. The rear end of the egg carrier 68 is supported by a dog 78 which is rigidly secured as at 79 to the under side of the runway 36 adjacent the pivot 37 thereof. The lower end of the dog 78 is provided with a hook 80 in which the rod 75 rests and which engages the rear side of one of the teeth 76. A hen will when leaving the nest 25 walk on the horizontal portion 39 of and depress the runway 36. During this movement of the runway 36, the lower end of the dog 78 will be swung forwardly in the arc of a circle having the pivot 37 for its center, and as the result the egg carrier 68 will be, since the hook 80 of the dog engages the rear side of one of the teeth 76 of the rod 75, advanced forwardly for a distance equal to the width of one of its egg receiving compartments. This movement of the egg carrier 68 will result in that compartment which carries the egg just laid being moved forwardly beyond the opening 28 of the nest 25 and in the next compartment being positioned below the opening 28. Since the front end of the egg carrier 68 has a limited pivotal movement on the guide wires 73 and since the rear end of the egg carrier 68 is supported by the hook 80 of the dog 78, there is no possibility of the hook 80 moving out of engagement with a tooth of the rod 75 during the actuation of the dog 78 by and as the result of the downward movement of the runway 36. When another hen enters the nest 25, the front door 12 will be released. The door will then gravitate to closed position, and during such movement it will elevate or return the runway to its normal position. During the movement of runway 36 to its normal position, the hook 80 of the dog 78 will be moved rearwardly with relation to the rod 75, and as soon as the runway 36 is in normal position the hook 80 will be positioned in rear of the next tooth 32 of the rod 75, whereby, when the runway 36 is again depressed by and during the act of a hen leaving the nest, the egg carrier 68 will be again advanced for a distance equal to the width of one of its egg receiving compartments.

From the foregoing description, taken in connection with the drawings, it will be seen that as the hen leaves the trap she registers her number and moves the egg carrier one compartment, thereby leaving a positive means for showing whether she laid an egg or not and the quality of the egg if one was laid, thus an accurate means is provided, which is automatic in its operation for determining which hens are laying and which are not.

Suitable supporting legs 82 may be provided for supporting the trap if so desired.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

What I claim as new is:—

1. A trap nest comprising a casing, having an opening in the front and rear ends thereof, a sliding door arranged to close the opening in the front of the trap, a pivoted door arranged to close the opening in the rear of the trap, a pivoted nest arranged in the casing, means secured to the nest for operating the front door when a fowl sits on the nest, a substantially rectangular frame pivotally secured intermediate its ends to the walls of the trap and arranged above the nest, a feed paper roller pivotally secured to the frame adjacent the forward end thereof, a drum rotatably carried by the frame adjacent the rear end thereof, guide rollers carried by the frame and arranged to engage the drum, carbon paper secured to the periphery of the drum, a strip of paper wound upon said feed roller and inserted between the drum and the guide rollers, and spring means normally holding the forward end of the frame in a raised position and the rear end of the frame in a lowered position, as and for the purpose specified.

2. A trap nest including a casing, a nest within the casing, a pivotally mounted exit runway, an egg carrier located below the nest and adapted to receive the eggs therefrom, means slidably supporting one end of the egg carrier, a ratchet rod extending from the other end of the egg carrier, and a dog rigidly secured to said runway and engaging said rod to support the other end of the egg carrier and to advance the egg carrier on the actuation of the runway by a hen.

3. A trap nest including a registering device comprising a pivoted frame, a drum rotatable in the frame adjacent one end thereof and provided with a recording element, a paper roller journaled in a frame adjacent to the other end thereof, paper guiding rollers journaled in the frame adjacent said drum, a paper receptacle carried by said frame, and a spring for normally holding said first named end of the frame depressed.

4. A trap nest including an elevated casing having an exit opening, a movably mounted exit runway adapted to be elevated to close the exit opening and adapted to be depressed by a hen to clear the exit opening and provide means by which the hen may reach the ground, means adapted to normally hold the runway in elevated position, a slidably mounted egg carrier provided with a plurality of egg receiving compartments, and means connecting the egg carrier and runway to permit the former to be advanced a distance equal to the width of its compartment when the runway is depressed.

5. A trap nest including a registering device comprising a pivoted frame, a drum rotatable in the frame adjacent one end thereof and provided with a transfer medium, a paper roller journaled in the frame adjacent the other end thereof, paper guiding rollers journaled on the frame adjacent said drum, a paper receptacle carried by said frame, the paper extending from the roller to the receptacle and passing about the guiding rollers in contact with the under side of the transfer medium, a spring for normally holding the first named end of the frame depressed, and a name plate adapted to be secured to the back of a hen for engagement with the paper in alinement with the transfer medium when the hen leaves the nest.

In testimony whereof I affix my signature in presence of two witnesses.

FRANK A. MEYER.

Witnesses:
W. F. STOFFLE,
L. SUMMERS.